United States Patent
Blount

(10) Patent No.: US 6,258,298 B1
(45) Date of Patent: *Jul. 10, 2001

(54) FLAME RETARDANT COMPOSITIONS UTILIZING AMINO CONDENSATION COMPOUNDS

(76) Inventor: David H. Blount, 6728 Del Cerro Blvd., San Diego, CA (US) 92120

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,847

(22) Filed: Sep. 8, 1998

Related U.S. Application Data

(62) Division of application No. 08/723,779, filed on Sep. 30, 1996, now Pat. No. 5,854,309.

(51) Int. Cl.$^7$ .......................... C09K 21/00; C09K 21/02; C09K 21/06; C09K 21/14
(52) U.S. Cl. .......................... 252/607; 252/608; 252/609; 252/601; 528/259; 523/179
(58) Field of Search .................... 252/609, 607, 252/601, 608; 525/428; 528/259; 523/179

(56) References Cited

U.S. PATENT DOCUMENTS

| | | | |
|---|---|---|---|
| 3,900,665 | * | 8/1975 | Weil ...................................... 428/276 |
| 3,955,987 | * | 5/1976 | Schaar et al. . |
| 4,246,146 | * | 1/1981 | Wood et al. . |
| 4,385,131 | * | 5/1983 | Fracalossi et al. ...................... 521/55 |
| 5,110,840 | * | 5/1992 | Blount ...................................... 521/85 |
| 5,314,928 | * | 5/1994 | Verhelst ................................ 521/159 |
| 5,344,855 | * | 9/1994 | Narita et al. .......................... 523/179 |
| 5,391,583 | * | 2/1995 | Blount ...................................... 521/85 |
| 5,430,081 | * | 7/1995 | Ohmae et al. ......................... 524/100 |
| 5,510,059 | * | 4/1996 | Yuki et al. ............................. 252/609 |
| 5,721,282 | * | 2/1998 | Blount ...................................... 521/50 |
| 5,854,309 | * | 12/1998 | Blount ................................... 523/179 |

* cited by examiner

*Primary Examiner*—Joseph D. Anthony

(57) ABSTRACT

Flame retardant compositions of this invention are produced by incorporating an amino condensation composition in a more flammable organic compound. The amino condensation compositions are produced by heating urea or heating urea with other nitrogen containing compounds that will condensate with or react with isocyanic acid and/or cyanic acid or heating urea first then reacting the condensation compounds with other nitrogen containing compounds. The amino condensation compounds may be mixed with or reacted with carbonization auxiliaries, aldehydes and fillers to produce an amino condensation composition which is incorporated in more flammable organic compositions such as polyurethanes, polyester resins, epoxy resins, vinyl resins and other resins. The amino condensation salts of phosphorus, boron or sulfur containing compounds and the amino condensation-aldehyde resins may also be used as the flame retardant compound in this invention. For example, polyurethane foams can be rendered less flammable with the amino condensation compounds or compositions and utilized as insulating materials.

5 Claims, No Drawings

FLAME RETARDANT COMPOSITIONS UTILIZING AMINO CONDENSATION COMPOUNDS

This application is a divisional of Ser. No. 08/723,779, filed Sep. 30, 1996 is now U.S. Pat. No. 5,854,309.

FIELD

The invention concerns urea being condensated with other organic compounds with a plurality of nitrogen atoms such as amino compounds to produce amino condensation compounds. The invention also concerns their preparation and use. The amino condensation compounds are useful to produce flame retardant plastics and flame retard natural products, and may be reacted with phosphorus and/or boron containing compounds to produce other flame retardant compounds. The amino condensation compounds may also be reacted with aldehydes to produce amino condensation-aldehyde resins for use as molding compounds or as a flame retardant compound.

BACKGROUND

The heating of urea to produce urea condensation compounds, such as a mixture of cyanuric acid and cyamelide, is known in the arts, but the use of these compounds as a flame retardant is novel. The condensation of isocyanuric acid and/or cyanic acid, (which are produced by heating urea), with other nitrogen containing compounds to produce flame retardant compounds is novel. The amino condensation compounds and their phosphorus and/or boron salts are used as flame retardant compounds in plastics and natural products. Urea and melamine were utilized as a flame retardant compound by Fracalossi, et al., in U.S. Pat. No. 4,385,131. Melamine was utilized as flame retardant compounds in polyurethanes by Yukuta, et al., in U.S. Pat. No. 4,221,875 and by Grinbergs et al., in U.S. Pat. No. 4,745,133. Amino phosphates was utilized by Blount in U.S. Pat. No. 5,010,113.

What is lacking and what is needed are useful inexpensive nitrogen containing organic compounds with a plurality of nitrogen moieties. The amino condensation compounds and/or their salts of this invention are novel flame retardant compounds. The amino condensation compounds such as urea condensation compounds, urea-melamine condensation compound, urea-dicyandiamide compounds, urea-guanidine condensation compounds, etc., are novel flame retardant compounds. What is additionally lacking are compositions having such amino condensation compounds and/or their salts employed therein.

SUMMARY

In one aspect, the invention comprises amino condensation compounds and their salts. Another aspect of the invention is a process to prepare amino condensation compound and/or their salts comprising serially contacting (A) urea (B) nitrogen containing compound that will condensate or react with urea; under conditions sufficient to prepare the amino condensation compounds. The urea may be first reacted with itself then reacted with Component B or with more urea plus Component B.

In another aspect, the invention comprises amino condensation salt of phosphorus and/or boron containing compound and a process to prepare a amino condensation salt of a phosphorus and/or boron containing compound employing phosphorus and/or boron containing compound that will react with the amino condensation compound under conditions sufficient to prepare the amino condensation salt of a phosphorus and/or boron containing compound, and a process to prepare an amino condensation salts of a phosphorus and/or a boron containing compound comprising serially contacting (A) urea (B) nitrogen containing compound that will condensate or react with urea (E) phosphorus and/or boron containing compound that will react with an amino condensation compound.

An addition aspect of this invention is the production of amino condensation-aldehyde resins and a process to prepare amino condensation-aldehyde resins under conditions sufficient to prepare the amino condensation-aldehyde resin comprising serially contacting (A) urea (B) nitrogen containing compound that will condensate or react with urea (F) aldehyde (H) a basic or acidic catalyst An additional aspect of the invention is use of the amino condensation compounds as a flame retardant in the production of amino condensation salts of phosphorus and/or boron compounds and in the production of amino condensation-aldehyde resins. The flame retardant use comprises contacting an otherwise more flammable organic material with the amino condensation compounds and/or amino condensation salts of phosphorus and/or boron containing compounds and/or amino condensation-aldehyde resins thereof under conditions sufficient to lower the combustibility of the otherwise more flammable organic material, for example plastics, natural products or polyurethanes. Thus, a further aspect of the invention is a flame-retardant composition comprising an otherwise more flammable organic material incorporated therewith a flame retardant amount of an amino condensation compound and/or a amino condensation salt of a phosphorus and/or boron containing compound, and/or amino condensation-aldehyde resin, carbonization auxiliaries and fillers.

The flame-retardant compounds of this invention are produced by heating urea (Component A) with a nitrogen containing compound (Component B) to above the melting point of urea to about 160 degree C. at ambient pressure for 1–3 hrs. Upon heating above the melting point urea form a very reactive compound isocyanic acid which will react with itself or other organic or inorganic nitrogen containing compounds especially amino compounds. In order to increase the flame retardant properties and carbonization properties of the amino condensation compound a carbonization auxiliary (Component C), such as, phosphorus acidic compounds, organic phosphorus compounds that will react with an amino compound, boric acid, etc., is added to the melted amino condensation compound mixed and/or reacted. Other carbonization auxiliaries may be mixed with the amino condensation compounds to produce the flame retardant amino condensation composition. The amino condensation compounds may be further reacted with an aldehyde (Component F) in the presence of a neutral or basic or acidic catalyst by mixing and heating the urea condensation compound with the aldehyde, usually in an aqueous medium, to just below the boiling point of the components at ambient or an elevated pressure thereby producing a urea condensation-aldehyde resin. Fillers, (Component G) and carbonization auxiliaries may be added to the amino condensation compounds or the amino condensation-aldehyde resin. The amino condensation compounds and amino condensation-aldehyde resins with or without carbonization auxiliaries and fillers may be reacted with or added to or applied to a more flammable organic material (Component D).

Component A

Urea is utilized as component A and may be in the form of a powder, crystals or a solid. Any suitable urea may be utilized that will react with a nitrogen containing compound.

Component B

Any suitable nitrogen containing compound that will react with isocyanic acid and/or cyanic acid may be utilized in this invention. The nitrogen containing compound may be an organic or an inorganic compound. Suitable organic nitrogen containing compounds may be an aliphatic, aromatic, cyclic, aliphatic-aromatic or aliphatic-cyclic compound such as, but not limited to, urea, urea derivatives for example, O-alkylureas, amino compounds, for example, melamine, melamine cyanurate, dicyandiamide, biuret, guanidine, cyanoguanidine and aminoguanidine, ammonium carbonate, alkyl carbamates, alkyl isocyanates, polyisocyanates, sulfamic acid, ammonium sulfamate, amines, polyamines, thioureas, alkylanolamine, polyamides, amino hydrogen phosphates, amidines, amides, aldimines, ketimines, guanidine carbonate, amino carbonates, aminoborates, amino sulfates, thiourea, thiourea derivatives, alkylanolamines, nitriles, etc., and mixtures thereof. Suitable inorganic nitrogen containing compounds such as, but not limited to, ammonium phosphate, diammonium phosphate, ammonium polyphosphate, ammonia borate, ammonium hydrogen sulfate, quaternary ammonium salts, ammonium bicarbonate, ammonium carbonate, etc. and mixtures thereof. The amino compounds are the preferred nitrogen containing compound. The nitrogen containing compound may be utilized in the amount of 10 to 300 percent by weight based on the weight of urea.

Component C

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 300 percent by weight of the amino condensation compound.

The nitrogen containing salts of phosphorus acids are the preferred carbonization compounds, such as amino phosphate, amino salts of organic phosphorus compounds and amino condensation salt of inorganic and organic phosphorus compounds. The amino condensation salt of phosphorus compounds are produced by contacting the amino condensation compounds with a phosphorus containing compound that will react with an amino compound, under conditions sufficient to prepare an amino condensation salt of a phosphorus compound. Suitable phosphorus compounds include, but not limited to, phosphoric acid, pyrophosphoric acid, triphosphoric acid, metaphosphoric acid, hydrophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkali metal dihydrogen phosphate and halogenated phosphate-phosphite and their halides and acids. Organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters and mixtures thereof. Amino condensation borates may be produced by contacting boric acid and amino condensation compound under conditions sufficient to prepare the amino condensation borates which may also be utilized as a flame-retardant compound. Amino condensation boron-phosphates may be produced by contacting boron-phosphates and amino condensation compounds under conditions sufficient to prepare amino condensation boron-phosphate compounds under conditions sufficient to prepare amino condensation boron-phosphate compounds which may also be utilized as a flame-retardant compound. The salt forming phosphorus containing compounds will react with the amino condensation compounds to form an amino condensation salt of a phosphorus containing compound.

Component D

Any suitable organic material which is more flammable than the amino condensation compounds, its salts and amino condensation-aldehyde resin may be used in this invention. Any suitable plastic resin composition or mixtures thereof and any suitable natural organic material maybe used in this invention and mixtures thereof. These materials may be in the form of a solid, cellular suspension, emulsion or solution. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyldienes, poly(vinyl acetate), aliphatic allyl compounds, polyacrylonitrile, aliphatic dienes, polybutadiene, butadiene-acrylonitrile, butadiene-styrene copolymers, aromatic vinyl compounds, heterocyclic vinyl compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to m wood, cellulose, lignin-cellulose, paper, cotton, wool, linen, dammars, copols, other natural resins, rosins lignin, natural rubber, natural proteins, e.g., soya bean protein, silk, glues, gelatin, etc.; modified celulose and mixtures thereof. Natural organic material and plastics may be mixed together. The amino condensation compounds, its salts and amino condensation-aldehyde resin or amino condensation composition maybe utilized in the amount of 10–200 percent, percentage based on the weight of the more flammable organic material.

Component E

Any suitable basic or acidic catalyst may be used in the reaction of amino condensation compounds with aldehydes. Suitable basic compounds include but not limited to, compounds containing alkali metal, alkaline earth metal and ammonia radicals and mixture thereof. Suitable acidic compounds include, but not limited to, halogen acids, acidic phosphorus containing compounds, acidic compounds containing sulfur, sulphonic acid halides, carboxylic acids, polycarboxylic acids, nitric acids and mixtures thereof. In some reactions basic or acidic catalytic are not necessary. A catalytic amount is utilized.

Component F

Any suitable aldehyde may be reacted with the amino condensation compounds. Suitable aldehydes include, but not limited to, formaldehyde, paraformaldehyde, acetoaldehyde, butyraldehyde, chloral, and other alkyl aldehydes, furfural, benzyl aldehyde and other aromatic aldehydes. Aqueous formaldehyde is the preferred aldehyde. Aldehyde may be utilized in the amount of up to 200 percent by weight, percentage based on the weight of amino condensation compound.

Component G

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, metals, oxides, carbonates, sulphates, phosphates, borates, glass beads or hollow glass beads. Hydrated aluminum oxide is preferred. They may be organic substances, such as, amino compounds, such as, urea, melamine, dicyandiamide, and other cyanuric derivatives or their formaldehyde resins, aminophosphates, amino salts of organic phosphates, phenol-aldehyde resin powder, powdered coke, graphite, graphite compounds and mixtures thereof. The organic halide flame retardant compounds may also be added as fillers. The filler may be used in the amount of 0 to 300 percentage based on the weight of the amino condensation compound.

Illustrative Embodiments

In general, the amino condensation compounds are compounds which are produced by heating urea with other nitrogen containing compounds that will condensate or react with urea to produce amino condensation compounds. The heated urea first form isocyanic acid and/or cyanic acid which polymerizes with itself to form a mixture of cyanuric acid and cyamelide and/or biuret. The urea condensation compound has the general formula of $(NHCO)_3$.

When urea is heated with another nitrogen containing compound, such as, melamine a different compound is formed. When four or moles of urea are reacted with one mol of melamine a new compound is formed that has the general formula of

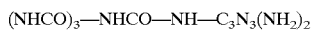

$(NHCO)_3—NHCO—NH—C_3N_3(NH_2)_2$

When one mol of urea is heated with one mol of melamine a new compound is formed that has the general formula of $NHCONHCN_3(NH_2)_2$.

When four or more moles of urea are reacted with dicyandiamide a compound is formed that has the general formula of

$(NHCO)_3—NHCO—HNC—(:NH)—NH—CN$.

When four or more moles of urea are reacted with guanidine a compound is formed that has the general formula of $(NHCO)_3—NHCO—(HN)_2C:NH$.

When four of more moles of urea are reacted with aminoguanidine a compound is formed that has the general formula of

$(NHCO)_3—NHCO—HNCNHNH$.

When four or more moles of urea are reacted with an alkyl carbamate a compound is formed that has the general formula of $(NHCO)_3—NHCO—NHCOOR$ wherein R is an alkyl radical.

Any amount of the amino condensation compound or the amino condensation compositon which includes the amino condensation compound and/or its salts and may include carbonization auxiliaries and fillers suitable for this invention may be utilized. Preferably, flame retardant amounts of the amino condensation compounds and/or its salts and/or the amino condensation-aldehyde resin or the amino condensation composition are from 10 percent by weight to about 200 percent by weight of the otherwise more flammable organic materials such as polyester resins, polyepoxy resins, polyurethane components, acrylic and acrylate resins, polyacrylonitrile, polystyrene, etc.

One method to measure this flame retardant capability is an oxygen index test. By selecting the various combinations of the amino condensation composition to incorporate into a more flammable organic material the average limiting oxygen index (LOI) can be raised 10 to 30 percent or more when compared to otherwise comparable samples without the flame retardant amino condensation composition. For example three flexible polyurethane foams with the amino condensation composition were raised more than 30 percent to a LOI of 31.7, 30.3 and 30.7.

When the amino condensation composition were incorporated into rigid polyurethane foam and tested with a propane torch with a ½" flame held 1" from the foam for one minute, the flame did not spread, a char was formed, and the flame went out when the torch was removed.

Various amino condensation compositions were incorporated into solid resins, for example, flexible polyepoxy resins, rigid polyepoxy resins, polyester laminating and flexible resin, polystyrene resin, polymethyl methyl acrylate resin, polyvinyl acetate resin, solid polyurethane, polyisoprene, acrylonitrile, etc, then tested with a propane torch having a ½" flame, and held 1" from the sample for one minute, the flame did not spread, and went out when the flame was removed. The said above material were tested without the amino condensation composition and all burned.

Various natural products such as wood shingles, paper, cotton cloth, and cardboard were coated with various amino condensation compositions in an aqueous emulsion containing 20% by weight of the powdered amino condensation composition then after the product had dried, they were tested by applying a ½" flame from a propane torch to about 1" from the products, and the flame did not spread whereas the uncoated products caught on fire and burned.

DESCRIPTION OF PREFERRED EXAMPLES

The present invention will now be explained herein-after by way of a few examples and comparative examples, these examples setting, however, no limits to this invention. Parts and percentages are by weight, unless otherwise indicated.

Example 1

100 parts by weight of urea is heated to above the melting point of urea and up to about 160 degree C. for 0.1 to 1 hour. Ammonia evolves from the melted urea thereby producing an amino condensation compound (urea condensation compound). The cooled amino condensation compound is ground into a fine powder.

Example 2

100 parts by weight of urea and 50 parts by weight of melamine are mixed then heated to above the melting point of urea and up to 160 degree C. for 0.5 to 2 hours. Ammonia evolves from the mixture thereby producing an amino condensation compound (urea-melamine condensation compound). The cooled amino condensation compound is ground into a fine powder.

Example 3

Example 2 is modified wherein 75 parts by weight of melamine is used instead of 50 parts by weight.

Example 4

Example 2 and 3 are modified wherein another nitrogen containing compound is used in place of melamine and selected from the list below:

| | |
|---|---|
| a) dicyandiamide | k) biuret |
| b) guanidine | l) ammonium bicarbonate |
| c) aminoguanidine | m) methylolurea |
| d) thiourea | n) methylthiocyanate |
| e) ethylamine | o) melamine phosphate |
| f) diethylamine | p) urea phosphate |
| g) ammonium carbonate | q) melamine borate |
| h) urea carbonate | r) guanidine carbonate |
| i) diethylanolamine | s) aniline |
| j) ammonium sulfamate | t) melamine cyanurate |
| k) ethyl carbamate | u) guanidine phosphate |
| l) ethyl isocyanate | v) acrylonitrile |

Example 5

About 100 parts by weight of the urea-melamine condensation compound of example 2 is mixed with 25 parts by weight of phosphoric acid (75%) then heated to above the melting point of the urea condensation compound for about 30 minutes there by producing a urea condensation salt of phosphoric acid.

Example 6

Example 5 is modified by first reacting 5 parts by weight of boric acid with the 25 parts by weight of phosphoric acid thereby producing a boron-phosphate condensation compound and utilizing it in place of the phosphoric acid in example 5.

Example 7

Example 5 is modified wherein another phosphorus containing compound is utilized in place of phosphoric acid and selected from the list below:

| | |
|---|---|
| a) pyrophosphoric acid | n) tris(2-chloropropyl) phosphate |
| b) phosphinic acid | o) triphenyl phosphite |
| c) phosphorus trichloride | p) tris 2-chloroethyl phosphite |
| d) phosphorus oxytrichloride | q) triethyl phosphite |
| e) phosphorus oxide | r) urea dihydrogen phosphate |
| f) ammonium dihydrogen phosphate | s) diethyl phosphite |
| g) mono-aluminum phosphate | t) trimethyl phosphite |
| h) dimethyl methyl phosphonate (DMMP) | u) dibutyl pyrophosphoric acid |
| i) dimethyl hydrogen phosphite | v) melamine hydrogen boron-phosphate |
| j) phenyl acid phosphate | x) hypophosphorous acid |
| k) methylchlorophosphine | y) methyl amine salt of phosphoric acid |
| l) phosphorus | z) O,O-dimethyl hydrogen dithiophosphate |
| m) phosphorus thiochloride | |

Example 8

Example 1 is modified wherein a phosphorus containing compound selected from the list in example 7 is added to the urea before it is heated thereby producing a mixture of urea condensation salt of a phosphorus containing compound and urea salt of a phosphorus containing compound. The mixture is ground into a fine powder.

Example 9

30 parts by weight of the melted urea-melamine condensation compound of example 2 are added to 100 parts by weight of a polypropylene triol with a 56 hydroxyl number and a mol wt. of 3000 thereby producing a stable emulsion for use in the production of flame retardant polyurethane products.

Example 10

Example 5 is modified wherein 20 parts by weight of powdered dimelamine phosphate is added to and mixed in with the melted urea condensation compound thereby producing a flame retardant amino condensation composition.

Example 11

Example 3 is modified wherein 25 parts by weight of melamine powder are added to and mixed in with the melted amino condensation compound thereby producing a flame retardant amino condensation composition.

Example 12

100 parts by weight of urea, 50 parts by weight of melamine powder and 20 parts by weight of boric oxide are mixed then heated above the melting point of urea and up to 160 degree C. for 45 minutes while agitating. Ammonia evolves from the solution, The urea-melamine condensation compound containing boric oxide is cooled, then ground into a fine powder thereby producing a flame retardant amino condensation composition.

Example 13

100 parts by weight of urea, 30 parts by weight of dicyandiamide and 20 parts by weight of boric acid are mixed then heated above the melting point of urea and up to 160 degree C. for 0.5 to 1 hour. Ammonia evolves from the mixture. The mixture of urea-dicyandiamide condensation containing urea salt of boric acid is cooled then grown into a fine powder thereby producing a flame retardant amino condensation composition.

Example 14

100 parts by weight of urea, 30 parts by weight of melamine phosphate are mixed then heated above the melting point of urea and up to 160 degree C. for 40 minutes thereby producing a flame retardant amino condensation salt of phosphate composition. After cooling it is ground into a fine powder.

Example 15

Example 12 is modified wherein 10 parts by weight of a phosphorus salt forming compound selected from the list below is added to and reacted with the amino condensation composition;

| | |
|---|---|
| a) phosphoric acid | h) phosphinic acid |
| b) pyrophosphoric acid | i) phosphorus oxytrichloride |
| c) dimethyl methyl phosphonate (DMMP) | j) ammonium dihydrogen phosphate |
| d) dimethyl hydrogen phosphite | k) dimethyl phosphoric acid |
| e) trimethyl phosphite | l) diethyl ethyl phosphonate |
| f) phenyl acid phosphate | m) magnesium hydrogen phosphate |
| g) phosphorus trichloride | n) mono aluminum phosphate |

Example 16

Example 2 is modified wherein 20 parts by weight of a halogenated flame retardant compound selected from the list below is mixed with the powdered urea-melamine condensation compound thereby producing a flame retardant amino condensation composition:
a) brominated epoxy olgmer
b) decabromodiphenyl oxide
c) pentabromodiphenyl oxide
d) 2,3-dibromopropanol
e) octabromodiphenyl oxide
f) tris (dichloropropyl) phosphite
g) tris(dichloropropyl) phosphite

Example 17

Example 3 is modified wherein 20 parts by weight of a powdered filler selected from the list below is mixed with the powdered urea condensation compound thereby producing a flame retardant amino condensation composition:

| | |
|---|---|
| a) hydrated aluminum oxide powder | o) urea phosphate |
| | p) silica powder |
| b) hydrated sodium silicate powder | q) phenol-formaldehyde resin powder |
| c) melamine | r) aluminum phosphate |
| d) dicyandiamide | s) thiourea |
| e) urea | t) hollow beads |
| f) melamine phosphate | u) expandable graphite |
| g) melamine borate | v) melamine salt of DMMP |
| h) ammonium phosphate | r) ammonium sulfate |
| i) ammonium pyrophosphate | s) magnesium chloride |
| j) ammonium carbonate | t) antimony trioxide |
| k) ammonium borate | u) boron-phosphate powder |
| | w) melamine boron-phosphate |
| l) ammonium sulfamate | powder |
| m) guanidine | x) ammonium boron-phosphate powder |
| n) guanidine carbonate | |

Example 18

30 parts by weight of the urea-melamine condensation compound of example 2 are mixed and reacted with 10 parts by weight of dimethyl methyl phosphonate (DMMP) thereby producing an amino condensation salt of DMMP composition, then it was added and mixed with 60 parts by weight of a flexible polyepoxy resins with its polyamine curing agent. The resin is cured then was tested with a ½" propane flame held 1" away for sample for 1 minute. The flame did not spread and the flame went out when the torch was removed.

Example 19

30 parts by weight of the amino condensation composition of example 10 are mixed with a flexible polyester resin containing its catalyst. The resin is cured then flame tested using a propane torch with a ¹/₁₂" flame held 1" form the sample for 1 minute. The flame did not spread and went out when the torch was removed.

Example 20

30 parts by weight of the amino condensation composition of 17c is incorporated into 70 parts by weight of a flexible polyurethane foam produced from MDI and a triol which weighs about 1.75 lbs./cu.ft. The foam was flame tested by using Calif. T133 Test wherein 100 gms of wood is burned on top of the foam. After burning the wood on the foam there was a 50.5 gms weight loss. A weight loss of less than 60 gms is necessary to pass the test.

Example 21

30 parts by weight of the amino condensation composition of example 10 are incorporated in a rigid polyurethane foam of about 2 lbs./cu.ft., produced using polymeric MDI and polyol. The rigid polyurethane foam was flame tested using a propane torch that had a ½" flame and held 1" from the foam. The flame did not spread and went out when the torch was removed.

Example 22

Example 14 is modified wherein another amino phosphorus containing compounds is selected from the list below and utilized in place of melamine phosphate:

| | |
|---|---|
| a) dimelamine phosphate | l) O-methyl urea |
| b) dicyandiamide phosphate | m) urea salt of boron-phosphate |
| c) urea dihydrogen phosphate | n) urea-formaldehyde phosphate |
| d) guanidine phosphate | o) aminophenol phosphate |
| e) aminoguanidine phosphate | p) ammonium urea phosphate |
| f) diethyltriamine urea phosphate | q) ammonium melamine phosphate |
| g) melamine salt of dimethyl methyl phosphonate | r) melamine salt of trimethyl phosphite |
| h) melamine salt of dimethyl hydrogen phosphite | s) melamine salt of phenyl acid phosphate |

-continued i) methylamine melamine phosphoric acid
j) methyl carbamate salt of phosphoric acid
k) melamine salt of boron-hydrogen phosphate

Example 23

Example 1 is modified wherein the urea condensation compound is heated and reacted with 20 percent by weight of urea, percentage based on the weight of the urea condensation compound.

Example 24

Example 4 is modified wherein the urea is first heated and reacted with itself to form a urea condensation compound then additional 20 percent by weight of urea, percentage based on the weight of the urea condensation compound, is added with the nitrogen containing compound.

I claim:

1. A method for reducing combustibility of organic material comprising incorporating and amino condensation compound and/or composition with the organic material, under reaction and/or mixing conditions of the organic material, said amino condensation composition produced by the method comprising of mixing, heating and reacting the following components:

(A) urea;
   (B) nitrogen containing compound that will condensate and/or react with isocyanic acid and/or cyanic acid produced by heating urea compound and selected form the group consisting of biuret, urea, urea derivatives, ammonium carbonate, alkyl carbamates, alkyl isocyanates, polyisocyanates, sulfamic acid, ammonium sulfamate, amines, polyamines, thioureas, thiourea derivatives, alkylanolamines, polyamides, amidine, amides, aldimines, ketimines, nitriles, ammonium hydrogen sulfate, guaternary ammonium salts, aminoborates, amino sulfates, guanidine carbonate, ammonium carbonate and mixtures thereof, in the amount of 10 to 300 percent by weight, percentage based on the weight of urea;
   components A and B are reacted thereby producing an amino condensation compound, then add and mix components
   (C) carbonization auxiliaries, in the amount of 1 to 300 percent by weight, percentage based on the weight of the amino condensation compound produced by reacting components A and B;
   (D) filler, in the amount of 1 to 300 percent by weight, percentage based on the weight of amino condensation compound;
   thereby producing a flame retardant amino condensation composition.

2. A flame retardant composition produced by incorporating a flame retardant amino condensation composition in an organic material, under reaction or mixing conditions and in an amount sufficient to reduce the combustibility of the organic material, said amino condensation composition produced by the process comprising of mixing, heating and reacting the following components;

(A) urea;
   (B) nitrogen containing compound that will condensate and/or react with urea, and selected from the group consisting of biuret, urea, urea derivatives, ammonium carbonate, alkyl carbamates, alkyl isocyanates, polyisocyanates, sulfamic acid, ammonium sulfamate, amines, polyamines, thiourea derivatives, alkylanolamines, polyamides, amidine, amides, aldimines, ketimines, nitriles, ammonium hydrogen sulfate, guanidine carbonate, quartermary ammonium salts, ammonium carbonate, amino borates, amino sulfates and mixtures thereof, in the amount of 10 to 300 percent, percentage based on the weight of urea;
   components A and B are reacted thereby producing an amino condensation compound, then the following components are added and mixed;
   (C) carbonization auxiliaries, in the amount of 1 to 300 percent by weight, percentage based on the weight of the amino condensation compound produced by reacting components A and B;
   (D) filler, in the amount of 1 to 300 percent, percentage based on the weight of the amino condensation compound produced by reacting component A and B;
   thereby producing an amino condensation composition.

3. A flame retardant composition of claim 2 wherein the nitrogen containing compound will condensate and/or react with isocyanic and/or cyanic acid, produced by heating urea, is selected from the group consisting of amines, polyamines, urea derivatives, biuret, thiourea, thiourea derivatives, guanidine carbonate, ammonium carbonate, urea carbonate and mixtures thereof, in the amount of 10 to 300 percent by weight, percentage based on weight of urea.

4. The flame retardant composition of claim 2 wherein the carbonization auxiliaries are selected from the group consisting of phosphorus containing compounds, boron containing compounds, boron-phosphorus containing compounds, silicon-phosphorus containing compounds and sulfur containing compounds that produce acidic components in the pyrolysis mixture, in the amount of 1 to 300 percent by weight, percentage based on weight of the amino condensation compound produced by reacting components A and B.

5. The flame retardant composition of claim 2 wherein the filler is selected from the group consisting of urea, melamine, dicyanadiamide, melamine cyanurate, amino phosphate, aminopolyphosphate, aminoplasts, phenoplasts, powdered synthetic resins, sawdust, carbohydrates, bituminous additives, graphite, graphite compounds, cyanuric derivatives, or their formaldehyde resins, powdered coke, silica, alkali metal silicates, alkaline earth metal silicates, metals, and metal silicates, oxides, carbonates, sulphates, phosphates, and borates, glass beads, hollow beads, hydrated aluminum oxide and mixtures thereof, in the amount of 1 to 300 percent by weight, percentage based on the weight of the amino condensation compound.

* * * * *